July 7, 1970 C. Z. LEINKRAM 3,519,891

THIN FILM RESISTOR AND METHOD FOR MAKING SAME

Filed April 16, 1968 2 Sheets-Sheet 1

July 7, 1970 C. Z. LEINKRAM 3,519,891

THIN FILM RESISTOR AND METHOD FOR MAKING SAME

Filed April 16, 1968 2 Sheets-Sheet 2

THERMAL TIME CYCLE
Cr-(PbO·SiO$_2$) SYSTEM

WITNESSES

Edwin E. Bassler

James F. Young

INVENTOR

Charles Z. Leinkram

BY Lee P. Johns

ATTORNEY

United States Patent Office 3,519,891
Patented July 7, 1970

3,519,891

THIN FILM RESISTOR AND METHOD FOR MAKING SAME

Charles Z. Leinkram, Bowie, Md., assignor to Westinghouse Electric Corporation, Pittsburgh, Pa., a corporation of Pennsylvania Filed Apr. 16, 1968, Ser. No. 721,734
Int. Cl. H01l 19/00
U.S. Cl. 317—101 4 Claims

ABSTRACT OF THE DISCLOSURE

A semiconductor device having on its surface a conductive glass layer consisting essentially of the reaction product of silicon dioxide, lead oxide, and chromium, which layer is suitable for use as a thin film resistor.

BACKGROUND OF THE INVENTION

Field of the invention

This invention relates to thin film resistors having high value sheet resistivity.

Description of the prior art

The technology used to produce resistors in silicon monolithic blocks consists of either diffusion to form the resistors or thin film vacuum evaporation methods of such materials as chromium and tantalum. While these methods have a fair modicum of success, they still have their limitations. One disadvantage of diffused resistors is that they possess a very marked positive temperature coefficient. Another disadvantage is that they must be isolated by diffusion from other circuit components which requires extra handling and a second diffusion step.

There is a need therefore in integrated circuit technology for rugged high value sheet resistivity resistors whose fabrication is compatible with the standard techniques used in processing integrated circuits. The need arises from the requirement for a high impedance for micropower circuits and the increased range of temperature performance required for future space efforts, as well as an increased packing density for it is usually the resistive elements in an integrated circuit that use the most area. There is a further need for resistive elements with high sheet resistance that show little or no change in their design values when measured over a wide temperature range such as from 77° K. to 373° K.

In accordance with this invention it has been found that the foregoing need may be satisfied by providing resistors which are the product of a combination of techniques utilizing vapor deposition of thin metal films, glass formation, and selective annealing. The product of such a procedure includes a semiconductor device comprising a body of semiconductor material having two active regions disposed therein, the regions being connected by a thin film resistor comprising a glass layer which is the reaction product preferably of silicon dioxide, lead oxide, and chromium.

Accordingly, it is a general object of this invention to provide a thin film resistor having a high sheet resistance valve that is compatible with integrated circuit fabrication.

It is another object of this invention to provide a thin film resistor which enables the fabrication of smaller circuit chips with greater electrical reliability.

It is another object of this invention to provide thin film resistors for use in a circuit having a high input impedance and a low noise level.

It is another object of this invention to provide thin film resistors having a high sheet resistance value that will show little or no change in their design value when measured over a wide temperature range.

Finally, it is an object of this invention to satisfy the foregoing objects and desiderata in a simple and expedient manner.

SUMMARY OF THE INVENTION

Briefly, the device of the present invention includes at least one active region disposed within a body of semiconductor material having at least one thin film resistor connecting at least one of said active regions, the thin film resistor comprising a glass layer between the active regions in the semiconductor material and the glass layer consisting essentially of silicon dioxide and at least one compound selected from the group consisting of lead oxide, rhenium heptoxide, magnesium dioxide, magnesium chloride, zinc chloride, and stannous oxide, and at least one material selected from a group consisting of tantalum, chromium, and other cations diffused partially into the layer of glass.

BRIEF DESCRIPTION OF THE DRAWINGS

For a better understanding of the nature and objects of this invention, reference is made to the drawings, in which.

Similar numerals refer to similar parts throughout the several views of the drawings.

DESCRIPTION OF THE PREFERRED EMBODIMENT

Figure 1:
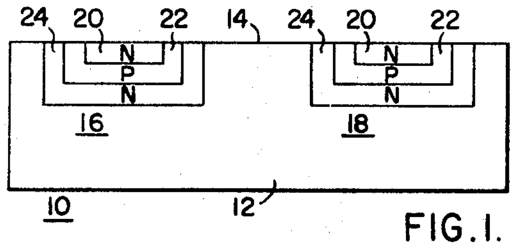
FIGS. 1 through 7 are sectional views showing the sequential steps for the preparation of a semiconductor device in accordance with the teachings of this invention.

Generally, the production of high value sheet resistivity resistors involves a combination of techniques utilizing vapor deposition of thin metal films, glass formation, and selective annealing. In FIG. 1, a semiconductor device is generally indicated at 10. It includes a substrate 12, which is a body of single crystal silicon of requisite resistivity and type with a surface 14 which is either polished or formed by epitaxial deposition. The substrate 12 includes two spaced active regions 16 and 18 which are planar transistors having N, P, and N regions 20, 22, and 24, respectively.

Figure 2:
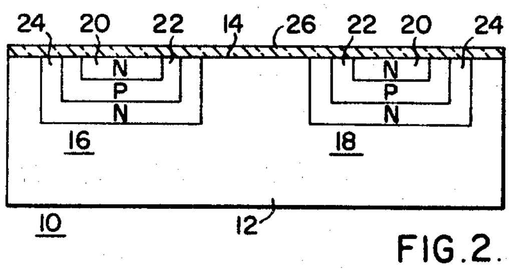

As shown in FIG. 2 an insulating or passivating layer 26, consisting of silicon dioxide, is thermally grown on the substrate surface 14 by subjecting the surface to a high temperature steam-oxidation atmosphere until the silicon dioxide surface has a thickness ranging from about 7000 to 10,000 A. The device 10 is then cleaned in boiling concentrated sulfuric acid and rinsed in successive rinses of a deionized water and isopropyl alcohol prior to placing it in an evaporator.

Figure 3:
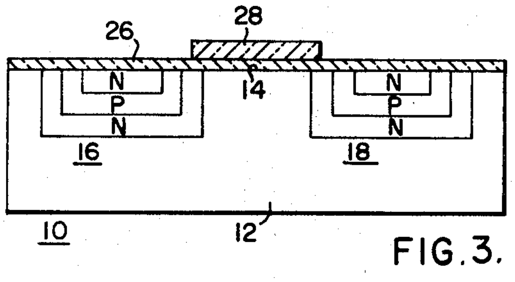

In FIG. 3, a modified resistor layer 28 is applied on the layer 26 such as by vacuum deposition until the layer 28 has a thickness of from about 1500 to 2500 A. The resistor layer 26 is comprised of at least one compound selected from the group consisting of lead oxide, rhenium heptoxide, magnesium dioxide, magnesium chloride, zinc chloride, and stannous oxide. The preferred compound is lead oxide.

Figure 4:
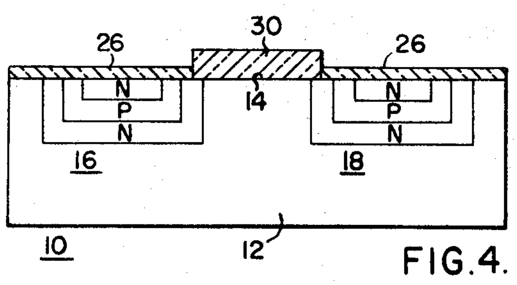

The device is then heated in an oxygen atmosphere for approximately 30 minutes at about 600° C. to form a plumbate glass resistor layer 30 (FIG. 4) which is a product of interdiffusion of the silicon dioxide layer 26 and the layer 28. Thereafter the device 10 is heated at a lower temperature of approximately 400° C. for an additional 30 minutes to allow the layer 30 to anneal.

Figure 5:
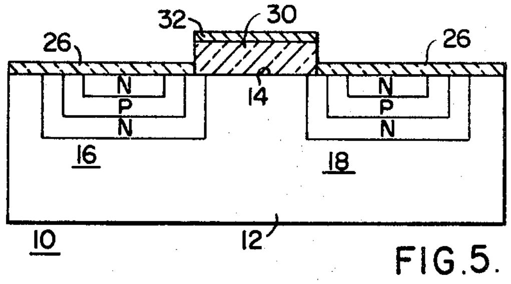

Subsequently, as shown in FIG. 5, a layer 32 of chromium is deposited by vacuum evaporation on the glass layer 30. Although chromium is the preferred material for the layer 32, other metals may be used including at least one metal other than the alkali metals, the alkaline earth metals, and the radioactive metals having an atomic size such that it will fit into an unpuckered ring of $SiO_2$ and PbO. Examples of such metals include tantalum, nickel, chromium, aluminum, silver, gold and titanium. The layer 32 may be deposited in any desired pattern which may be provided by the use of photolithographic etching technique in the usual manner, or by photoetching of the deposited layer.

Figure 6:
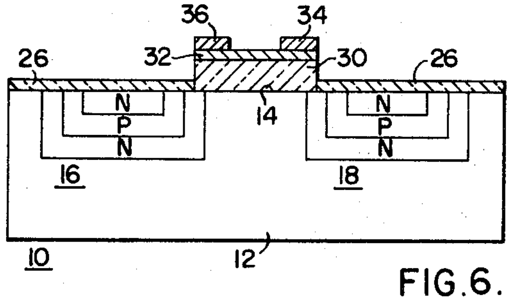

Thereafter, as shown in FIG. 6, spaced contacts 34 and 36, which are preferably of gold, are deposited on the chromium layer 32 and have a thickness of about 10,000 A.

Figure 7:
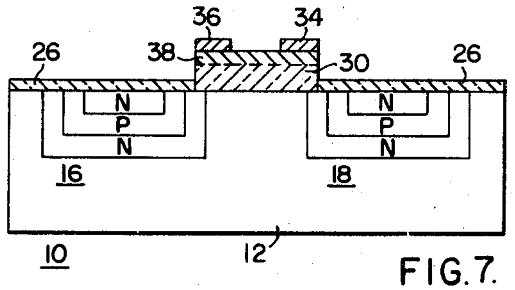

The device 10 is then heated at an elevated temperature ranging from about 400° to 700° C. in an inert atmosphere, whereby the chromium from layer 32 diffuses into the glass layer 30, forming a chromium-glass layer 38 as shown in FIG. 7. The layer 38 has a very high resistance of from about 1000 to 2000 ohms per square area, to over a megohm per square depending upon the desired end product. This is to be compared with prior known resistances of about 600 ohms per square such as for systems having chromium and silicon dioxide to which no lead oxide has been added.

The following example is illustrative of the present invention:

EXAMPLE

A slice of single crystal silicon having a thickness of about 10 mils is used as a substrate which includes two spaced active regions having N, P and N regions similar to those shown in FIG. 1. The slice of single crystal silicon is subjected to an oxidation treatment including high temperature steam or dry oxygen until a silicon dioxide surface having a thickness of about 9000 A. is obtained. The slice is then cleaned in boiling concentrated sulfuric acid, rinsed in deionized water, cleaned in boiling nitric acid, re-rinsed in flowing deionized water, and dried in successive rinses of isopropyl alcohol.

The slice is then placed in a vacuum evaporator and the chamber pumped down to approximately $10^{-5}$ mm. Hg. Lead oxide is deposited onto the cleansed oxide surface of the silicon slice by boiling the lead oxide from a heated platinum filament inside the evaporation chamber. The lead oxide charge is approximately 50 milligrams in weight. The platinum filament is heated to 700° C. and kept at temperature until all of the lead oxide passes from the liquid to the vapor phase. The lead oxide deposition continues until a thickness of 2000 A. is reached on the thickness monitor.

The slice is then removed from the evaporator and is heated in a muffle furnace at 600° C. in ambient air for 30 minutes to form plumbate glass from the lead oxide and silicon dioxide layers. Thereafter, the temperature is lowered to 400° C. for an additional thirty minutes to anneal the glass.

The slice is then placed in a vacuum at 150° C. for 15 minutes and bombarded with ions in an argon atmosphere at the micron pressure range for the purpose of cleaning the glass surface and removing any adsorbed contaminants.

A layer of chromium having high purity is then deposited on the lead glass surface by evaporating chromium from a tantalum boat in a partial vacuum of about $2\times10^{-6}$ mm. Hg. The sheet resistivity is monitored during the deposition of chromium and values of from 150 ohms per square area are used.

The contacts, as defined by photolithography, are then deposited first by applying a layer of chromium having a thickness of 500 A. followed by a deposit of gold having a thickness of 10,000 A. which layers are deposited in a partial vacuum of $2\times10^{-6}$ mm. Hg. The photolithographic technique used consists of developing out the pattern required in a photoresist, performing the vacuum deposition, and then stripping the photoresist from the sample, thereby removing all undesired metal.

Figure 10:
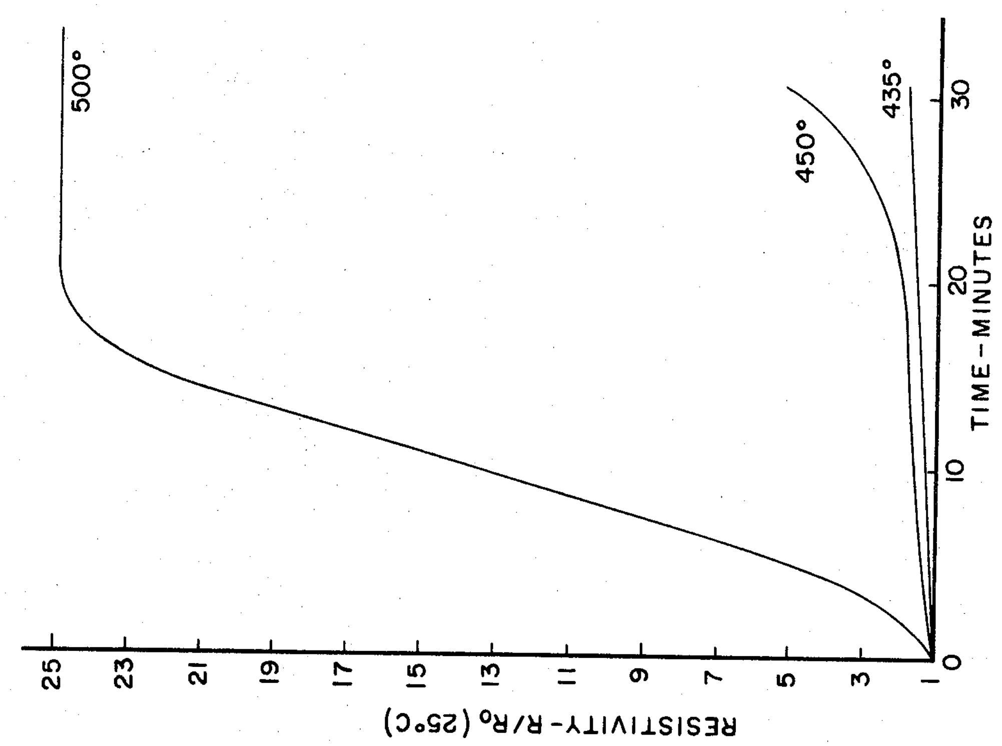
FIG. 10 is a chart of resistivity versus anneal time in minutes of a Cr-($PbO.SiO_2$) system.

Thereafter time and temperature heat treatment cycle is employed to vary the absolute resistance value of the resistor. For that purpose reference is made to the ordinate of FIG. 10. (FIG. 10 shows the reduced sheet resistivity obtained by dividing the value at any given time by the value at $t=0$). The abscissa is the time at temperature. Slopes are shown for data taken at temperatures of 435°, 550° and 500° C. Evidence of diffusion begins to occur about 400° C. with the slope increasing as the temperature is increased. At 500° C. the curve approaches an asymptotic value. Visual observation of the color change from metallic silver to translucent green is evidence of chromium diffusing into the plumbate glass surface.

Figure 11:
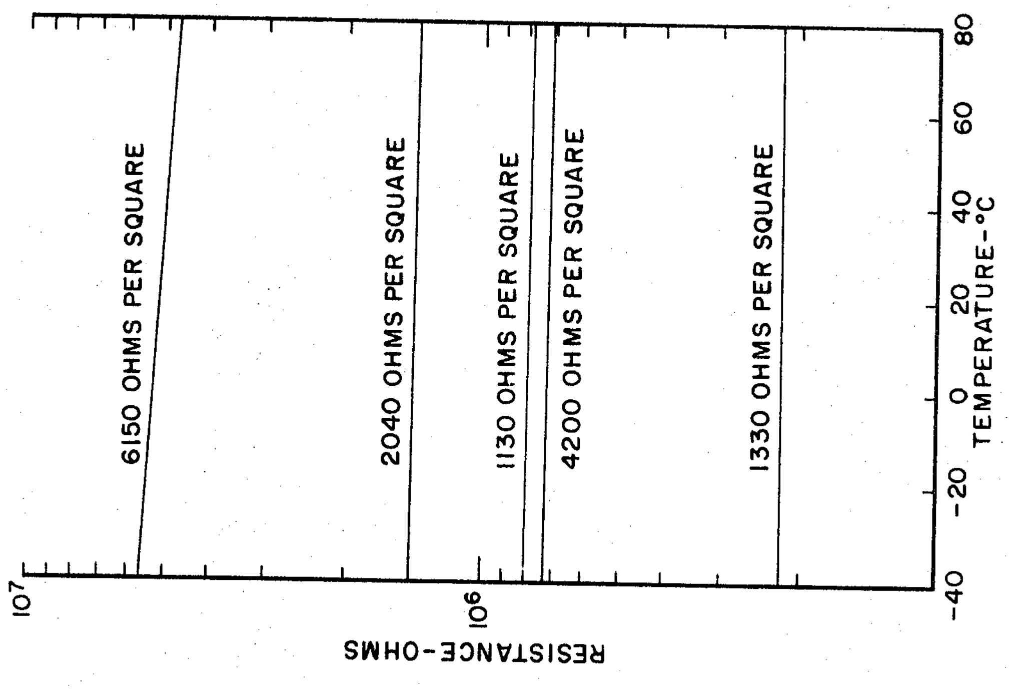
FIG. 11 is a chart of resistance versus temperature for various sheet resistances, demonstrating the thermal coefficient of resistance.

FIG. 11 shows the thermal coefficient of resistance for various sheet resistivities. As the sheet resistivity increases in value, the slope of the lines becomes more negative. For comparison, a sample with a 300 ohms sheet resistance had a mobility of $5/6\pm1/16$ cm.²/volt-sec. in a field of 2000 gauss. When the sample was completely diffused to a sheet resistivity of about 1000 ohms the mobility was less than 0.01 cm.²/volt-sec.

Figure 9:
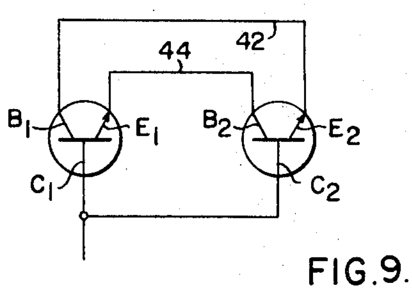
FIG. 9 is a schematic view of the device shown in FIG. 8.
Figure 8:
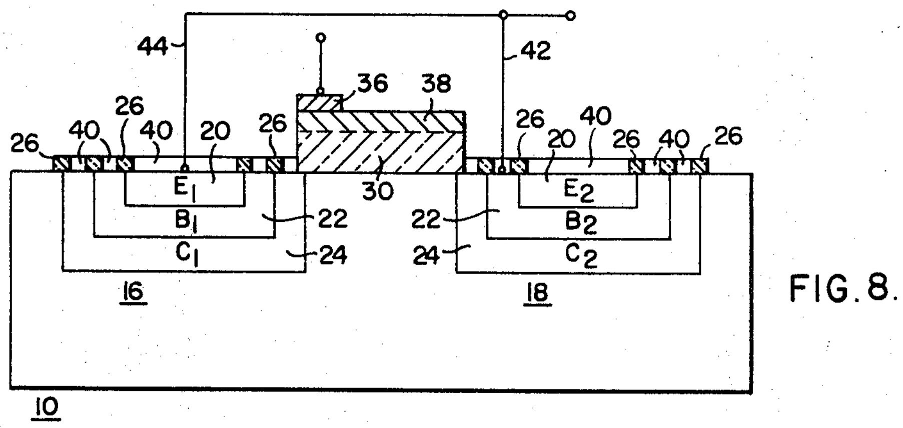
FIG. 8 is a sectional view through an operative semiconductor device which has been prepared in accordance with the sequence of steps shown in FIGS. 1 through 7.

An operative example of the device of the present invention is shown in FIGS. 8 and 9 which was produced substantially as described in FIGS. 1 to 7. The body 10 in FIG. 8 is a body of semiconductor material having two spaced active transistor regions. Each transistor consists of emitter regions 20 base regions 22, and collector regions 24. Collector regions are connected in an electrical circuit relationship through the glass layer 30 and the chrome-glass layer 38. In the device of FIG. 8 a plurality of spaced holes 40 are etched in the original silicon dioxide layer 26 such as by the use of photolithographic etching technique. Lead wires 42 and 44 are attached to the emitter and base regions 20 and 22 ($E_1$ and $B_2$), respectively, to establish an electrical circuit relationship therebetween. One gold contact 36 with a lead wire is likewise provided on the surface of the chromium-glass layer 38. $B_1$ and $E_2$ can be connected by external leads, by the well-known lead crossover technique or by any other suitable means known to one skilled in the art, as indicated in FIG. 9.

Accordingly, the device of the present invention and method for producing the same provides a rugged high value sheet resistance resistor which may be fabricated in accordance with standard techniques used in processing integrated circuits. High sheet resistance films or resistors enable the fabrication of smaller circuit chips with an increase in electrical reliability. High value resistors in a circuit such as a channel amplifier give a high input impedance and a lower noise figure for the amplifier stage, and since the resistor shows almost no change with temperature, a circuit capable of operating reliably over a wide thermal range.

What is claimed is:

1. A semiconductor device comprising a body of semiconductor material, at least one active region disposed therein, a silicon dioxide layer on said body, at least one thin film glass resistor connected to at least one of said active regions, the glass resistor consisting essentially of a portion of said silicon dioxide layer and at least one compound selected from a group consisting of lead oxide, rhenium hept-oxide, magnesium dioxide, magnesium chloride, zinc chloride, and stannous oxide, and at least one material selected from a group consisting of tantalum, nickel, chromium, aluminum, silver, gold, and titanium diffused partially into the layer of glass.

2. The device of claim 1 in which the glass layer is composed of the reaction product of lead oxide and silicon dioxide.

3. The device of claim 1 in which chromium is diffused into the glass layer.

4. The device of claim 1 in which the reaction product consists of silicon dioxide, lead oxide, and chromium.

References Cited

UNITED STATES PATENTS

| | | | |
|---|---|---|---|
| 2,950,996 | 8/1960 | Place et al. | 338—308 |
| 3,052,573 | 9/1962 | Dumesnil | 338—308 |
| 3,252,831 | 5/1966 | Ragan. | |
| 3,359,467 | 12/1967 | Cook. | |
| 3,402,081 | 9/1968 | Lehman | 117—200 X |

ROBERT K. SCHAEFER, Primary Examiner

D. SMITH, Jr., Assistant Examiner

U.S. Cl. X.R.

338—308; 29—620; 317—235; 117—200, 327